United States Patent [19]

Yokosawa et al.

[11] Patent Number: 4,860,130

[45] Date of Patent: Aug. 22, 1989

[54] ROTARY HEAD TYPE DIGITAL AUDIO SIGNAL REPRODUCING APPARATUS

[75] Inventors: Seiichi Yokosawa; Ken-ichiro Kawasaki, both of Saitama, Japan

[73] Assignee: Pioneer Electronic Corporation, Tokyo, Japan

[21] Appl. No.: 164,028

[22] Filed: Mar. 4, 1988

[30] Foreign Application Priority Data

Mar. 6, 1987 [JP] Japan .................................. 62-50301

[51] Int. Cl.⁴ ............................................. G11B 21/10
[52] U.S. Cl. .................................. 360/77.02; 360/69; 360/71; 360/73.03; 360/78.02
[58] Field of Search ................. 360/69, 71, 72.1, 72.2, 360/73.03, 76, 77.1, 77.02, 77.04, 77.06, , 77.08, 77.11, 78.02

[56] References Cited

U.S. PATENT DOCUMENTS 4,544,872 10/1985 Hirano et al. ................ 360/77.06 X
4,669,005 5/1987 Takayama et al ............... 360/77.11

Primary Examiner—John H. Wolff
Attorney, Agent, or Firm—Sughrue, Mion, Zinn, Macpeak & Seas

[57] ABSTRACT

In a rotary head type digital audio signal reproducing apparatus such as an R-DAT or the like, disturbances in the operation of a capstan servo circuit due to erroneous detection of sync signals or interference caused by incompletely erased pilot signals are prevented. Differences between the levels of crosstalk of pilot signals from the two tracks adjacent the on-track being scanned are checked to see if they have a predetermined relationship with the level of the signal being currently supplied to the capstan servo. If this predetermined relationship is not satisfied, supply of the signal which represents the amount of track deviation to the capstan servo is inhibited.

6 Claims, 7 Drawing Sheets

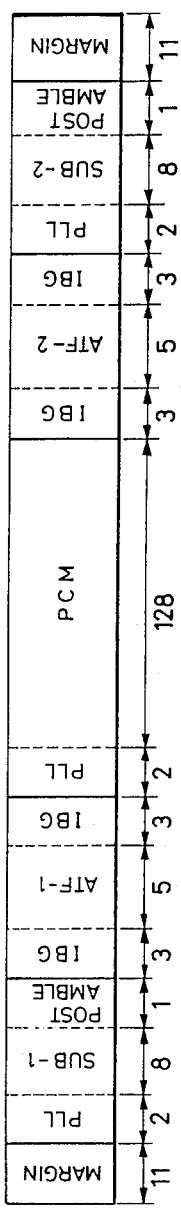
FIG. 1A   TRACK FORMAT
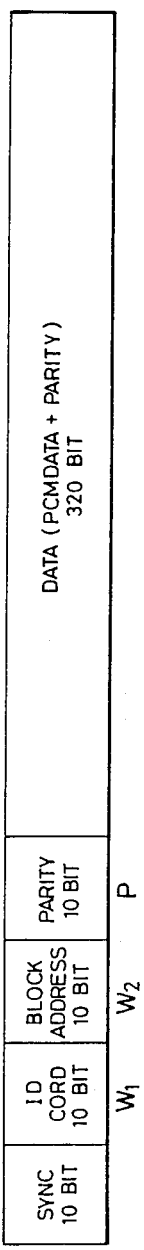
FIG. 1B   BLOCK FORMAT
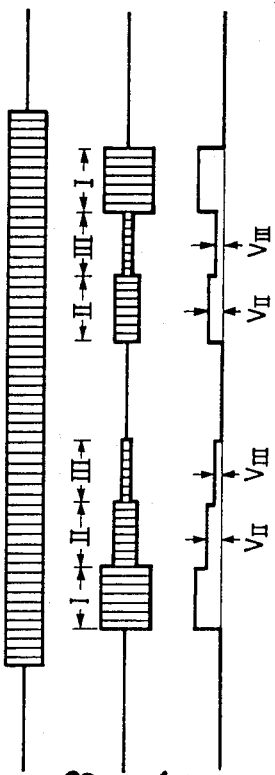
FIG. 3A
FIG. 3B
FIG. 3C

WAVEFORM OF ON-TRACK PILOT SIGNAL

WAVEFORM OF 45°-OFFSET PILOT SIGNAL

WAVEFORM OF 90°-OFFSET PILOT SIGNAL

AZIMUTH LOSS

WAVEFORM OF 135°-OFFSET PILOT SIGNAL

THE OTHER ADJACENT TRACK (MAY INCLUDE CROSS TALK FROM TRACK ADJACENT TO THAT TRACK)

ON-TRACK   THE OTHER ADJACENT TRACK   ONE ADJACENT TRACK

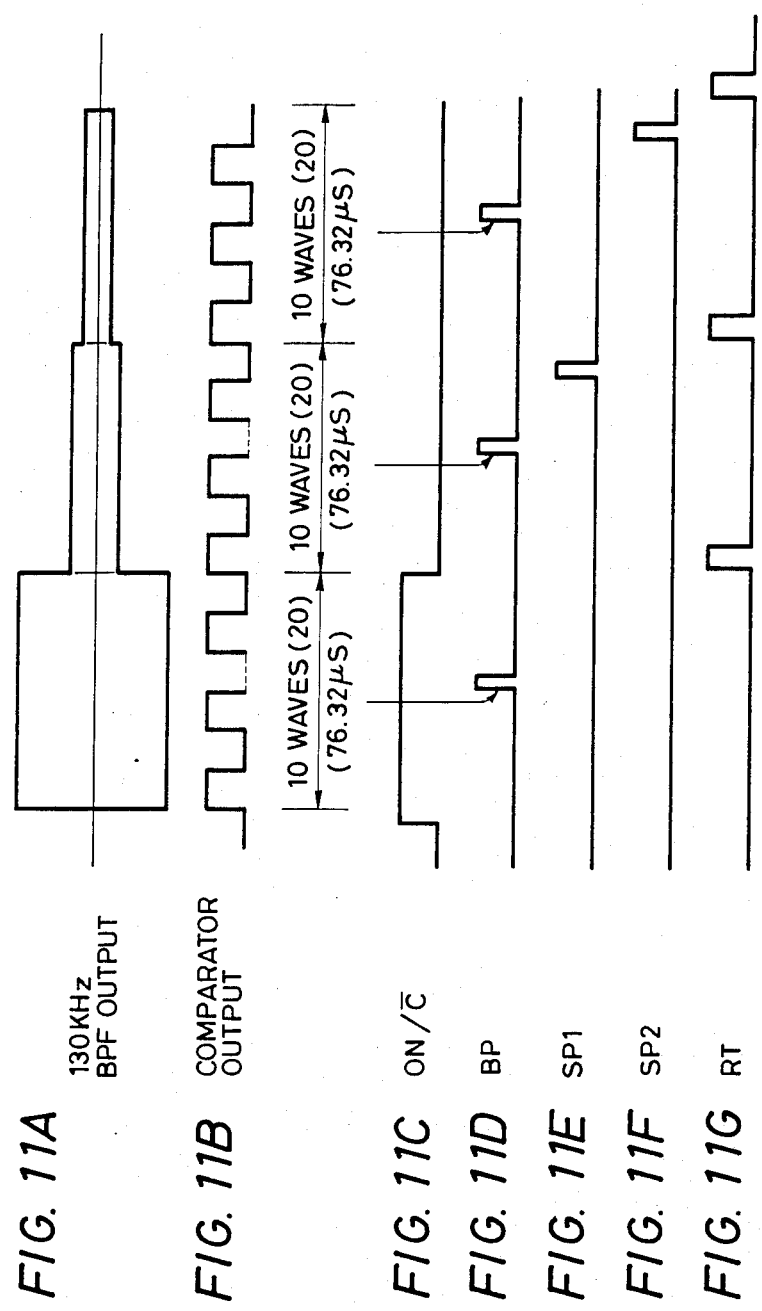

ROTARY HEAD TYPE DIGITAL AUDIO SIGNAL REPRODUCING APPARATUS

BACKGROUND OF THE INVENTION

The present invention relates to a rotary head type digital audio signal reproducing apparatus suitable for reproducing digital PCM audio signals that have been recorded in the form of signal helical tracks on a recording medium, one track being formed per unit time, with a rotary head.

A technique is known in which audio signals are recorded on magnetic tape with a helical scanning rotary head in the form of helical tracks, one track being formed per unit time, and reproduced thereafter. A digital signal recording reproducing apparatus known as R-DAT (rotary head type digital audio tape recorder) has been designated for recording audio signals, such as PCM signals, and thereafter reproducing the same.

The format of tracks recorded with an R-DAT has a pattern as shown in FIG. 1A. Each of recording regions SUB and PCM is composed of a plurality of blocks as shown in FIG. 1B. The numerals in FIG. 1A represent the numbers of blocks occupied by the respective regions.

ATF-1 (ATF=automatic track finding) between SUB-1 and PCM and ATF-2 between PCM and SUB-2 are each a region provided for ensuring that tracking control i.e., control for allowing a rotary head to correctly scan the recorded tracks during reproduction, can be accomplished only in response to the output of the head, that is, without the need for employing a special head.

In an R-DAT, the pilot signals recorded in the two ATF regions are such that during playback of magnetic tape, the recorded tracks are scanned with two rotary heads having a scanning width larger than the width of each track, and that the reproduction output of the pilot signals from the two tracks adjacent to the track being scanned is used to control the tracking of the rotary heads. The track pattern for ATF is as shown in FIG. 2. ATF-1 and ATF-2 located in the front and rear portions, respectively, of each track have a low frequency (small azimuth-effect) signal $f_1$ which is employed as a tracking pilot signal. This signal is used for the purpose of detecting the levels of crosstalk for each of the two tracks adjacent to the track being reproduced. The difference between these levels is employed as a tracking error signal.

In each of ATF-1 and ATF-2 is recorded a sync signal for identifying the location at which the pilot signal $f_1$ is recorded. In the presence of crosstalk, the sync signal is unable to distinguish the on-track signal from the signals from adjacent tracks. Thus, the sync signal is selected in such a way that it not only has a frequency capable of producing an azimuth-effect but also has a pattern which is unique with respect to the PCM signal. If the head having a + (positive) azimuth is designated A and the head having a −(negative) azimuth as B, two different sync signals are provided for the purpose of distinguishing head A from B. Stated more specifically, a sync 1 signal $f_2$ having a frequency of $f_M/18$ (=522 kHz) and a sync 2 signal $f_3$ having a frequency of $f_M/12$ (=784 kHz), associated with heads A and B, respectively, are recorded in predetermined positions.

In an R-DAT which does not employ an erasing head, a new signal is written over the previously recorded signal. In order to enable such overwriting, an erase signal $f_4$ having a frequency of $f_M/6$ (1.56 MHz) is recorded at a predetermined position for erasing the previously recorded pilot signal $f_1$, sync 1 signal $f_2$, and sync 2 signal $f_3$.

The pilot signals for ATF are located at different positions on the on-track (i.e., the track presently being scanned) and the two adjacent tracks. The level of the pilot signal on the on-track differs on a time basis from the levels of each of the pilot signals on the adjacent tracks, and hence the three different levels can be sampled independently of each other.

Five blocks are assigned to each of the ATF regions ATF-1 and ATF-2, and the pilot signal $f_1$ is recorded in two of these blocks. The sync signals $f_2$ and $f_3$ are recorded in an area covering one or one-half block from the center of the position in which one of the two adjacent tracks is recorded. The pilot signal $f_1$ on the other adjacent track is recorded in such a way that its center is positioned two blocks after the beginning of the sync signal recorded on the on-track. A sync signal composed of one block is assigned to an odd-numbered fame, and a sync signal composed of a half block is assigned to an even-numbered frame.

As described above, the sync signals to be recorded in the ATF region have different frequencies depending upon which head is used in scanning, and these sync signals also have different recording lengths in odd-numbered frames and even-numbered frames. This design enables four consecutive tracks to be distinguished from one another since they are provided with different ATF regions. The pattern of the ATF regions is of the four-track completed type in which the pattern is cyclically repeated every four tracks.

When a magnetic tape on which signals have been recorded in the format shown in FIG. 1A is played back with a rotary head, an RF signal of the type shown in FIG. 3A is reproduced from the head. If this RF signal is obtained by the playback of a track with an odd-numbered frame (A) as shown in FIG. 2, it may be passed through a bandpass filter (BPF) of 130 kHz so as to obtain a pilot signal $f_1$ as shown in FIG. 3B.

The signal in zone I is due to the pilot signal on the on-track, and those in zones II and III result from crosstalk of the pilot signals on a track with an odd-numbered frame (B) and on a track with an even-numbered frame (B), respectively. If the rotary head were scanning the on-track correctly, the envelope levels of zones II and III, or the values of $V_{II}$ and $V_{III}$ indicated in FIG. 3C would be equal to each other. However, if a tracking deviation occurs, $V_{II}$ is not equal to $V_{III}$ ($V_{II} \neq V_{III}$) and the amount and direction of the deviation of the rotary head with respect to the ontrack can be determined by the magnitude and polarity of the difference between $V_{II}$ and $V_{III}$. Therefore, by actuating a capstan servo according to the difference between $V_{II}$ and $V_{III}$ so as effect fine adjustment of the tape speed, the rotary head can be controlled to stay correctly, centered on the on-track.

In order to achieve the operation described above, it is necessary that the sync signals located at predetermined positions be correctly detected for sampling the levels of $V_{II}$ and $V_{III}$. In practice, however, an R-DAT which does not have an erase head and which performs second and third cycles of recording using an overwrite mode often fails to correctly detect the sync signals and to sample $V_{II}$ and $V_{III}$ for generating a correct error signal.

In an R-DAT, signals may be recorded within two blocks on either side of the center of the PCM region. The level of recording of the pilot signal $f_1$ (130 kHz) in an R-DAT is slightly lower than those of recording other signals. This is done in order to ensure that the previously recorded pilot signal $f_1$ can be erased by an erase signal $f_4$ in the overwrite mode since signals having lower frequencies are recorded at deeper levels in the magnetic tape. However, reducing the recording level of the pilot signal $f_1$ sometimes causes a problem in that the previously recorded sync signal $f_2$ or $f_3$ cannot be completely erased if a new pilot signal $f_1$ is written over these sync signals.

Depending on the algorithm (i.e., the set of processes) employed for sync detection, incomplete erasure of previous sync signals may take place either ahead of or behind newly recorded sync signals but the effect of either phenomenon is the same and must be circumvented. Otherwise, the level of the frequency component of the pilot signal in the currently reproduced RF signal will be sampled according to the previously recorded sync signal. The level of this pilot signal should theoretically be equal to that of the crosstalk of the sampling signal from one of the two tracks adjacent to the on-track. In fact, however, the frequency components sampled is actually the pilot signal from the on-track, and hence an extremely large signal level will be produced as a result of this sampling. Subsequently, the frequency component of the pilot signal in the RF signal being reproduced two blocks later is sampled and the difference between the two sampled values, one being currently obtained and the other obtained two blocks previously, is used as the level of track deviation applied to control the capstan servo. However, the previously sampled level relates to the on-track rather than that of the crosstalk from an adjacent track, and the level difference obtained is of such a great magnitude that it is far from being indicative of the actual amount of track deviation. In this situation, the operation of the capstan servo is disturbed, causing adverse effects on tape transport.

In the overwrite mode where the previously recorded pilot signal $f_1$ is erased with a new pilot signal $f_1$ there occurs no problem if the same apparatus is employed which recorded the signals. In practice, however, the recording level various from one apparatus to another, and especially between different manufacturers. In this regard, apparatus A may have, for example, a deep recording level whereas set B affords a shallow recording level. In this situation, there is no problem in using the apparatus A to write new information over information which has been recorded on the tape with the apparatus B. In the opposite case where the apparatus B is used to write information over information which has been recorded with set A, the previously recorded pilot signal $f_1$ cannot be completely erased and will interfere with the overwritten pilot signal by being added to it or being subtracted from it. Even if the sync signal is correctly detected, the interference by the previously recorded pilot signal precludes detection of the correct amount of track deviation.

SUMMARY OF THE INVENTION

The present invention has been accomplished in order to eliminate the aforementioned problems of the prior art R-DAT system. A principle object, therefore, of the present invention is to provide a rotary head type digital audio signal reproducing apparatus that prevents the operation of a capstan servo from being disturbed on account of either erroneous detection of sync signals or interference by incompletely erased pilot signals.

A rotary head type digital audio signal reproducing apparatus of the present invention which has been developed to attain the above-stated object checks to see if the difference between the levels of crosstalk of pilot signals from the two tracks adjacent to the on-track being scanned has a predetermined relationship with the level of the signal being currently supplied to a capstan servo, and if the predetermined relationship is not satisfied, the apparatus will not supply the capstan servo with a signal that represents the amount of track deviation based on the difference between the levels of crosstalk of those pilot signals. By employing this arrangement, the apparatus of the present invention prevents the operation of the capstan servo from being disturbed due to either erroneous detection of sync signals or interference by incompletely erased pilot signals.

BRIEF DESCRIPTION OF THE DRAWINGS

FIGS. 1A and 1B show a track format and a block format, respectively, used in an R-DAT;

FIG. 3A to 3C are diagrams illustrating the principles of tracking control with the track pattern shown in FIG. 2;

FIGS. 11A to 11G taken together from a timing chart showing the waveforms of signals generated in various parts of the system shown in FIG. 4.

DESCRIPTION OF THE PREFERRED EMBODIMENTS

A preferred embodiment of the present invention is described hereinafter with reference to the accompanying drawings.

Figure 2:
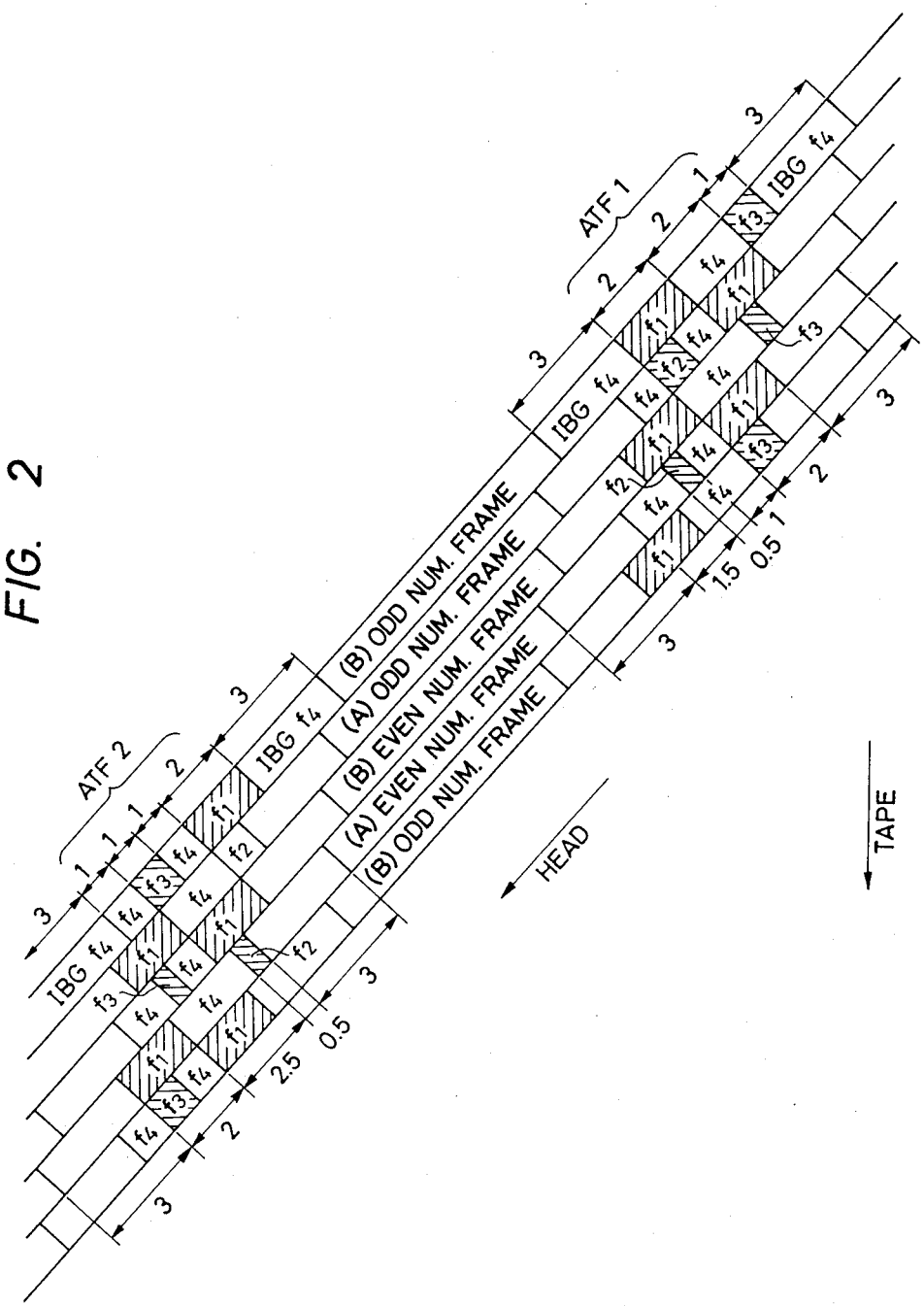
FIG. 2 is a diagram showing an ATF track format used in R-DAT.
Figure 4:
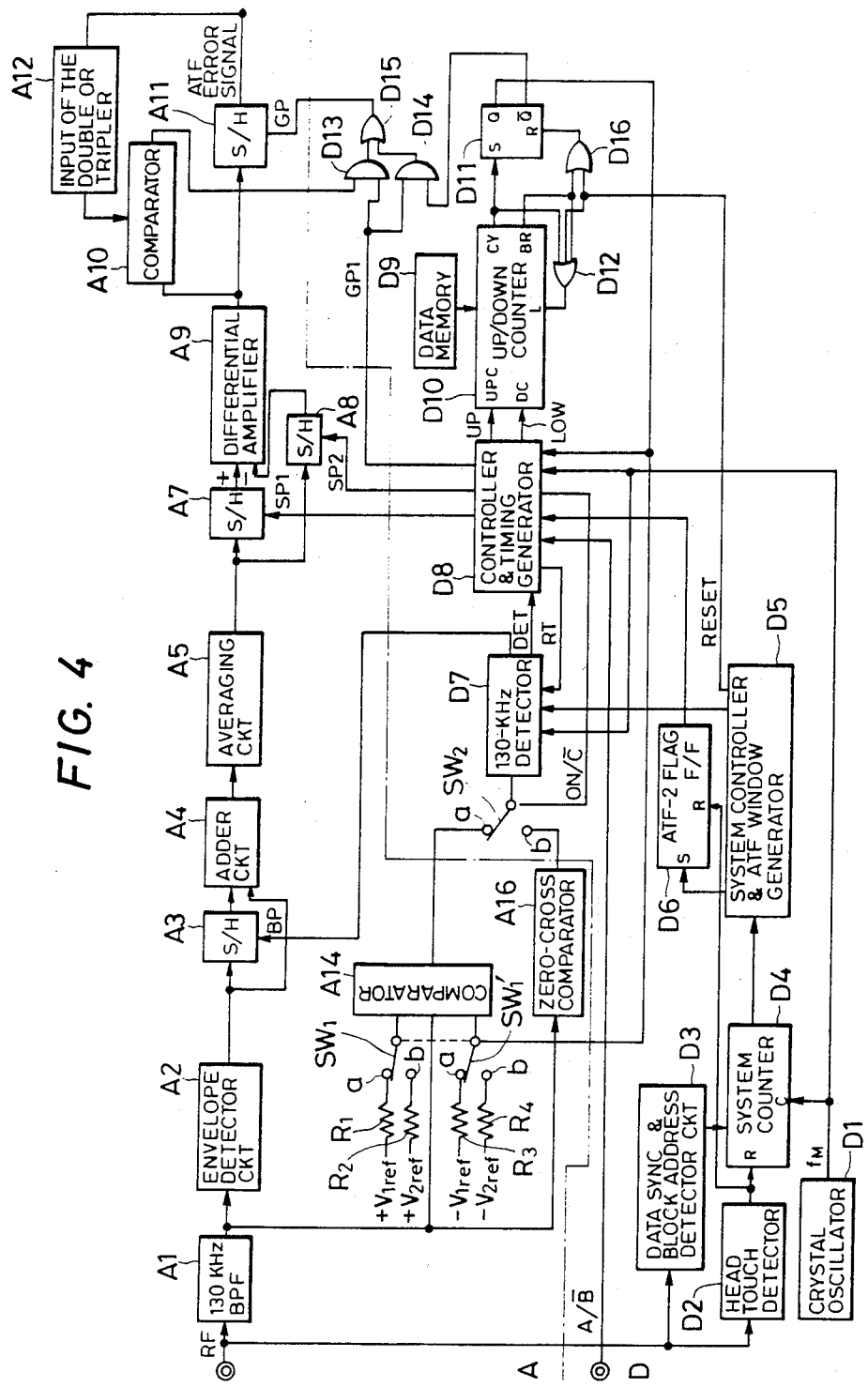
FIG. 4 is a block diagram showing essential parts of a rotary head type digital audio signal reproducing apparatus according to a preferred embodiment of the present invention.

FIG. 4 is a block diagram showing essential parts of a rotary head type digital audio signal reproducing apparatus constructed according to one preferred embodiment of the present invention.

The circuit shown in FIG. 4 is generally divided into two portions, an analog processing unit A (shown above the one-short-and-one-long dashed line) and a digital processing unit D (shown below that line).

The analog processing portion A will first be described. A 130 kHz bandpass filter A1 (BPF) is supplied at its input with an RF signal reproduced with a rotary magnetic head (not shown). The bandpass filter A1 transmits only the 130 kHz component of a pilot signal and rejects the signal on either side of this band. An envelope detector circuit A2 is supplied at its input with the output from the 130 kHz BPF A1. The envelope detector circuit A2 converts the amplitude of the 130 kHz pilot signal to a.d.c. level, which is supplied to the input of a sample-and-hold (S/H) circuit A3 and to one of the two inputs of an adder circuit A4.

The S/H circuit A3 samples and holds the output of the envelope detector circuit A2 in response to a sampling signal BP (described below in detail) applied to its control input. The output of the S/H circuit A3 is thereafter supplied to the other input of the adder circuit A4. The adder circuit A4 adds its two inputs, one being the output of the envelope detector circuits A2 and the other being the output of the S/H circuit A3, and the sum is supplied to an averaging circuit A5.

The output produced by the envelope detector circuit A2 during each of the periods of the on-track pilot signal, the pilot signal from one adjacent track, and the pilot signal from the other adjacent track is sampled and held in the S/H circuit A3 in response to the sampling pulse BP. The sampling pulse BP serves as a time index for storing in the S/H circuit A3 the first-half value of the output of the envelope detector circuit A2 in the first half of each period of the pilot signal. In the ideal situation where the output of the envelope detector circuit A2 contains no ripple and where there is not interference by such factors as incomplete erasure of the pilot signal, the S/H circuit A3 is unnecessary and the output of the envelope detector circuit A2 may be immediately supplied to a S/H circuit A7 and to the inverting input of a differential amplifier A9. In practice, however, it is impossible to produce a ripple-free output from the envelop detector circuit A2, and hence one-point sampling would cause a significant error if there is present interference by such factors as incomplete erasure of the pilot signals as in the case of overwriting. The error can be reduced by averaging the values sampled at two points in time during the same period. The S/H circuit A3, adder circuit A4 and averaging circuit A5 are employed to do this. If desired, sampling can be effected at three or four points of time; alternatively, the sampling times in the first and second halves of each period can be extended and the peak values in that period averaged to produce an even smaller error.

The S/H circuit A7 samples and holds the level of crosstalk from one adjacent track in response to a sampling pulse SP1 supplied from a controller and timing generator (described in detail below). A S/H circuit A8 samples and holds the level of crosstalk from the other adjacent track in response to a sampling pulse SP2 also supplied from the controller and timing generator. The relationship between the sampling pulse BP and each of the sampling pulses SP1 and SP2 will be described in detail below, and it suffices to mention at this point that BP is generated in the first half of each period whereas SP1 and SP2 are generated in the second half of the periods of the pilot signals from the two adjacent tracks.

The output of the S/H circuit A7 is supplied to the noninverting input of the differential amplifier A9, and the output of the S/H circuit A8 is supplied to the inverting input of the same amplifier. The differential amplifier A9 outputs the difference in level between the two input signals, namely, the amount of track deviation as determined by the difference between the crosstalk from one adjacent track and the crosstalk from the other adjacent track. The output of the differential amplifier A9 is supplied to one of the two inputs of a comparator 10 and to the input of a S/H circuit A11. The other input of the comparator A10 is supplied with the output of a doubler or tripler circuit A12 which doubles or triples the output of the S/H circuit A11. As a result, the comparator A10 produces a high "H" output if the level of output from the differential amplifier A9 is lower than a reference level. The S/H circuit samples and holds the detected amount of track deviation (i.e., the output of differential amplifier A9) in response to a sampling pulse GP, and thereafter supplies it to the capstan servo as an ATF error signal.

The output of the S/H circuit A11 is supplied to the input of the doubler or tripler circuit A12. Therefore, the level of the ATF error signal held in the S/H circuit A11 is doubled or tripled by the circuit A12 and supplied to the comparator A10 as its reference input.

A comparator A14 is supplied at its input with the 130 kHz component which is the output from the BPF A1. If the amplitude of the 130 kHz component exceeds the positive reference level, the comparator A14 produces a logic "1"; if the amplitude of the 130 kHz component exceeds the negative reference level, the comparator A14 produces a logic "0"; and if the amplitude of the 130 kHz component does not exceed the reference level on either side, the comparator A14 produces an output at the previously produced logic level. In other words, the comparator A14 functions as a hysteresis comparator. Two positive and negative reference levels are provided, with one of the positive reference level being selected by a switch SW1 and one of the reference levels on the negative side being selected by a switch SW1'. The contact position of each switch is set in response to a control signal. When both switches SW1 and SW1' are set to their respective contacts b the reference levels are set in such a way as to expand the range of the dead zone.

The 130 kHz component at the output of the BPF A1 is also supplied to the input of a zero-crossing comparator A16, and the output of this zero-crossing comparator A16 is supplied to the input of a 130 kHz detector D7 through the contact b of the switch SW2. The 130 kHz detector D7 is also supplied with the output of the comparator A14 through the contact a of switch SW2. In other words, both comparators A14 and A16 output the 130 kHz component from the BPF A1 after it is converted to a digital signal.

The digital processing unit D will now be described. A crystal oscillator D1 generates a basic clock $f_M$ for driving the system. The basic clock $f_M$ from the output of the crystal oscillator D1 is supplied to the clock (CK) terminal of each of the system counter D4, 130 kHz detector D7, and controller and timing generator D8.

A head contact detector D2, which is supplied with an RF signal at its input, determines whether the RF signal is on (i.e., whether the head is in contact with tape). If the answer is yes, the output of the detector D2 resets the system counter D4 and ATF-2 flag flip-flop (F/F) D6 to set them to their initial states.

A data sync and block address detector circuit D3 detects the data sync and block address of the subcode and PCM and performs compensation for the system counter D4 on the basis of the detected data. The data sync and block address detector circuit D3 may include a PCM equalizer, a zero detector, an 8/10 converter, and other components, but a detailed explanation of the system composition is omitted here since such is otherwise well known.

The system counter D4 identifies the approximate positions at which various signals are recorded on the tracks by controlling most of the period during which the head is in contact with the tape. A system controller and ATF window generator D5 decodes the output of the system counter D4 and forms ATF−, PCM− and other windows while generating a pulse at the time when approximately half of the head-tape contact period lapses. The generated pulse is applied to the ATF-2 flag F/F D6 for setting the latter; the ATF window formed being applied to the 130 kHz detector D7.

The 130 kHz detector D7 generates a sampling pulse BP and a detection pulse DET. The controller and timing generator D8, composed of a counter, flag F/F, a gate, etc., is supplied with the following inputs: a detection pulse DET from the 130 kHz detector D7, a head switching pulse HSWP (A/$\overline{\text{B}}$ from the servo system which assumes a high "H" level when the scanning is being effected by the head A and a low "L" level when the scanning is by the head B, the Q output of the ATF-2 flag F/F D6, the Q output from the F/F D11, and the clock signal from the crystal oscillator D1. Based on these inputs, the controller and timing generator D8 outputs sampling pulse signals SP1, SP2 and GP1, as well as an up signal UP and a down signal DOWN.

The sampling pulse signal SP1 is supplied to the control input of the S/H circuit A7 and the sampling pulse signal SP2 is supplied to the control input of the S/H circuit A8. As already mentioned, these sampling pulse signals are generated in the latter half of each period. The level of the pilot signal is held in the S/H circuit A3 at a point of time in the first half of each period in response to the sampling pulse BP from the 130 kHz detector D7 and, in the second half of each period, the average of the output from the S/H circuit A3 and the output from the envelope detector circuit A2 is held in the S/H circuits A7 and A8 in response to the sampling pulse signals SP1 and SP2, respectively. As a result, the average of the value sampled at points of time in the first and second halves of each period are held by these sample-and-hold circuits.

A sampling pulse GP1 is produced a predetermined time after the transmission of the sampling pulse SP2 as an OK signal when the pilot signal on the on-track is found to have been detected in a digitally correct manner, namely, five out of ten cycles have been detected. The sampling pulse GP1 is supplied to each of the two-input AND gates D13 and D14.

A single pulse of the up signal UP is produced at the end of ATF processing when all of the internal flags, which are turned on when the pilot signal on the on-track, the crosstalk from the pilot signal on one adjacent track and the crosstalk from the pilot signal on the other adjacent track are detected in a digitally corrected manner, are turned on. The up signal UP is supplied to the UPC terminal of an up/down counter D10 which then starts to count up. A single pulse of the down signal DOWN is produced when not all of the internal flags are turned on (i.e., the up conditions are not satisfied). The down signal DOWN is supplied to the DOWNC terminal of the up/down counter D10, which then starts to count down.

A data memory D9 stores data indicating the center value of up/down counter D10. The data in the data memory D9 is used to set the up/down counter D10 at the neutral point when a carry or borrow is produced. As described above, the up/down counter D10 counts up when the pilot signals on the on-track and the two adjacent tracks are correctly detected, and counts down if this condition is not met. A signal from the carry output CY of the counter D10 is supplied to the set (S) input of an RS F/F D11 and a signal from the borrow output BR is supplied to both a three-input OR gate D12 and a two-input OR gate D16. When the correct track is being scanned, pilot signals on the on-track and the two adjacent tracks are consecutively detected, whereupon a carry signal is produced from the carry output CY of the up/down counter D10, whereupon the RS F/F D11 produces a high "H" level signal at the Q output. The Q output of the RS F/F D11 is applied to the controller and timing generator D8 and to switches SW1 and SW1, Switches SW1 and SW1, change their position to contact b in response to the high "H" level signal from the Q output of the RS F/F D11.

The three-input OR gate D12 is supplied not only with the carry and borrow signals from the up/down counter D10 but also with a reset signal RESET from the system controller and AFT window generator D5. The output of the OR gate D12 is applied to the load terminal L of the up/down counter D10. When a carry or borrow signal is generated, the data from the data memory D9 is set in the up/down counter D10.

A two-input AND gate D13 is supplied with the output of the comparator A10 and the sampling pulse signal GP1 from the controller and timing generator D8. The output of the AND gate D13 is applied to one input of a two-input OR gate D15. A two-input AND gate 14 is supplied with the sampling pulse signal GP1 from the controller and timing generator D8 and the $\overline{\text{Q}}$ output of the RS F/F D11. The two input OR gate 15 is supplied at one input with the output of the two-input AND date D13 and at the other input with the output of the two input AND gate D14. The OR gate D15 produces at its output a sampling pulse signal GP which is applied to the control input of the S/H circuit A11.

The two-input OR gate D16 is supplied at one input with the borrow signal from the up/down counter D10 and at the other input with the reset signal RESET from the system controller and ATF window generator D5. The output of the OR gate D16 is connected to the reset (R) terminal of RS F/F D11. The switch SW 2 changes its position in response to a switching signal ON/$\overline{\text{C}}$ from the controller and timing generator D8.

Figure 5:
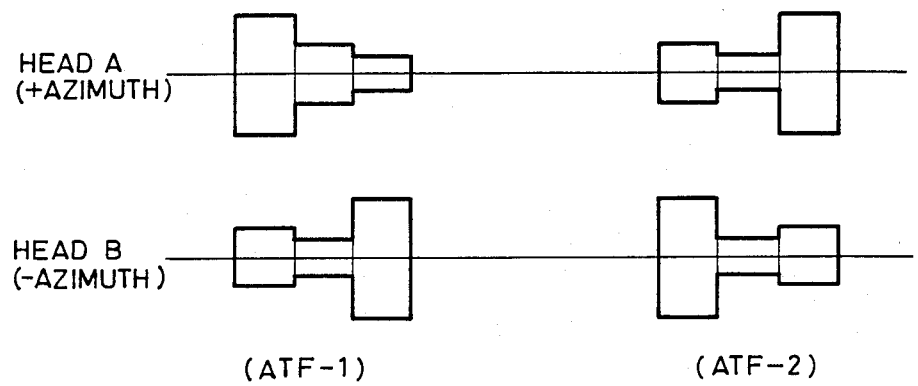
FIG. 5 shows the relationship between the pilot signal level on each track and an ATF position.

The relationship between the pilot signal level and the ATF position is shown in FIG. 5. As shown, the on-track pilot signal of the highest level occurs on the frontmost position in ATF-1 when scanning is being done with the head A (positive azimuth) and in ATF-2 with the head B (negative azimuth). It also occurs on the rearmost position in ATF-2 when scanning is made with the head A (positive azimuth) and in ATF-1 with the head B (negative azimuth).

Figure 6:
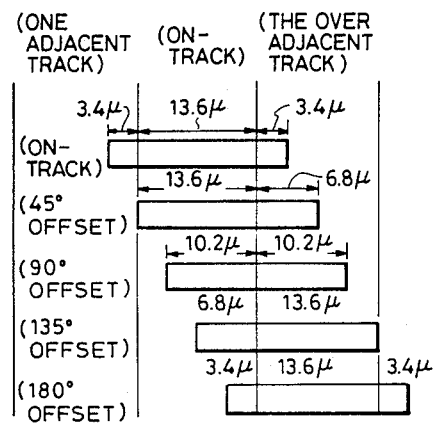
FIG. 6 shows the relationship between track deviation and head position.
Figure 7:
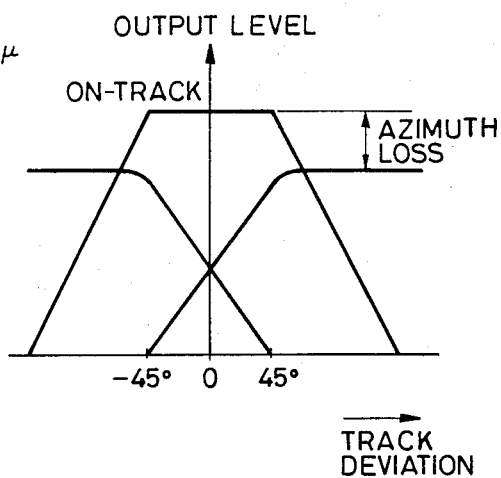
FIG. 7 shows the relationship between track deviation and the output level of the pilot signal.

The relationship between the amount of track deviation and the head position is shown in FIG. 6. The relationship between the track deviation and the output level of the pilot signal is shown in FIG. 7. As shown, therein the level of the on-track pilot signal is decreased if the track deviates from the head by more than 45°, in which case the levels of the pilot signals from the adjacent tracks are increased. If the track deviation exceeds 180°, there occurs a complete inversion between the output level of the on-track pilot signal and the level of the pilot signals for the adjacent tracks. However, the levels of the pilot signals from the adjacent tracks will not be equal to the highest level of the on-track pilot signal because of the azimuth loss due to the difference in azimuth.

Figure 8:
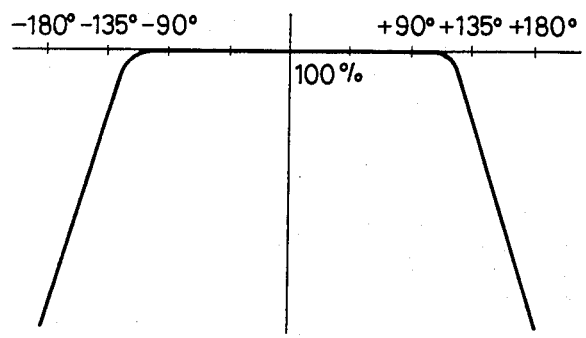
FIG. 8 shows the relationship between track deviation and the probability of sync detection.

The relationship between the amount of track deviation and the probability of sync detection is shown in FIG. 8. The sync signal indicating the position of a pilot signal is detected and used to sample the level of the pilot signal on the track adjacent to the on-track. As shown in FIG. 8, the sync signal having this function can be detected almost componentally if the track deviation is up to approximately 100° but sync detection is substantially impossible if the track deviation exceeds 130°.

Figure 9:
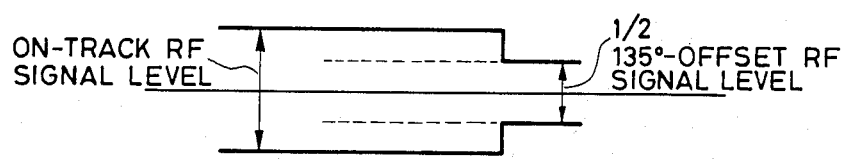
FIG. 9 shows the levels of an on-track RF signal and a 135° offset RF signal.

The envelope of the RF signal is shown schematically in FIG. 9, in which the waveform of the on-track RF signal is indicated by a solid line and that of a 135° deviated Rf signal by a dashed line. If the track deviation is 135°, the level of the RF signal is decreased by half, disabling the reading of correct data.

The levels of the pilot signals on the on-track and two adjacent tracks as a function of track deviation are shown schematically in FIG. 10 (assuming the absence of irregularities in the tracks and variation in the sensitivities of the heads A and B). If the tracking is correct (i.e., the on-track pilot signal is being correctly scanned), the levels of crosstalk from the pilot signals on the two adjacent tracks are the same and less than half the level of the on-track pilot signal. When the track deviation is 45°, the crosstalk from the pilot signal on one of the two adjacent tracks disappears. As the track deviation becomes greater, the difference between the level of the on-track pilot signal and the level of crosstalk from the remaining pilot signal on one adjacent track decreases, and a level inversion occurs at approximately 135°.

To summarize the foregoing discussion, the pilot signal on one of the two tacks adjacent the on-track cannot be detected if the track deviation exceeds 45°, and the hence track deviation is no more than 45° if the pilot signals for the periods of on-track and two adjacent tracks can be detected. Therefore, it can safely be regarded that magnetic tape is running stably if the pilot signals for all periods can be detected and that the tape is not running stably if the pilot signal in the period of either one of the two adjacent tracks fails to be detected.

As mentioned above, the pilot signal from one of the two adjacent tracks cannot be detected if the tape is running unstably. Therefore, the rising edge of a pilot signal cannot be correctly detected in ATF-2 (when reproduction is being effected with head A) or in ATF-1 (when head B is used as the active playback head), in which case the pilot signals on the adjacent tracks precede the pilot signal on the ontrack.

The operation of the system shown in FIG. 4 will be described hereinafter. At the start of operation, the track to be scanned is not necessarily in the correct tracking position, and hence it is only the pilot signal on the ontrack that can be correctly detected. The position of the on-track pilot signal can be detected in terms of the ATF position and by means of the output of the playback head. If the track to be scanned is not on the correct tracking position, the pilot signal has a low level, in which case the threshold value used as a reference level is desirably low for ensuring easy detection. In practice, however, erroneous detection may occur on account of various factors such as noise and, in consideration of this possibility, a certain dead zone range is preferably provided for detecting the pilot signal on the on-track.

When the system controller and ATF window generator D5 outputs a reset signal RESET, it is applied to the up/down counter D10 and RS F/F D11 via the three-input OR gate D12 and two-input OR gate, respectively, so as to initialize the counter D10 and flip-flop D11. As a result, the Q output of the RS F/F D11 assumes a low "L" level and the $\overline{Q}$ output assumes a high "H" level, and the switches SW1 and SW1' change their respective positions to contact a. When these switches are on the side of contact a, the comparator A14 is supplied with the smaller range of reference levels, $+V_{1ref}$ and $-V_{1ref}$, so as to set the detection sensitivity at the higher level.

Switch SW2 changes its position in response to the switching signal ON/$\overline{C}$, which assumes a high "H" level during the period of on-track pilot signal; the switch SW2 is set to contact b when this switching signal is at a high "H" level and to contact b when the signal is at a low "L" level. Therefore, when the on-track pilot signal is to be converted to a digital signal, the comparator A14 (having a dead zone) is used, and its output is supplied to the input of the 130 kHz detector D7 via the contact of switch SW2. If the pilot signal on either one of the two adjacent tracks is to be detected, the digital signal obtained by conversion from the pilot signal with the zero-cross comparator A16 is applied to the input of the 130 kHz detector D7 via contact b of switch SW2.

To detect a pilot signal of one full wave and a half, the 130 kHz detector D7 applies a sampling pulse BP to the control input of the S/H circuit A3 and applies a detection pulse DET to the controller and timing generator D8.

The controller and timing generator D8 operates according to the state of the Q output from the RS F/F D11. When the Q output is at a high "H" level, the controller and timing generator D8, assuming that tracking is stable, goes into the mode of detecting an ATF error signal irrespective of the ATF position. If the on-track signal fails to be correctly detected, the controller and timing generator D8 will not output a sampling signal GP1, which is produced only when the on-track pilot signal is correctly detected.

When the pilot signals on the on-track and two adjacent tracks are correctly detected, the controller and timing generator D8 supplies an up signal UP to the up/down counter D10 which then counts up by "1". If not all of the pilot signals in the three periods are correctly detected, the controller and timing generator D8 supplies a down signal DOWN to the counter D10 which then counts down by "1".

If the Q output of the RS F/F D11 is at a low "L" level, or if it is found that correct tracking is yet achieved, the operation of detection an ATF error signal is performed only in the case where the on-track pilot signal precedes the pilot signal on the two adjacent tracks. In other words, only in the region ATF-1 (when reproduction is being made with the head A) or ATF-2 (when the head B is used as the active playback head) is the operation of pilot signal detection performed and the detected amount of track deviation applied to the capstan servo. Such detecting operation is not performed in any other situations. Digital detection of the pilot signals is performed in the same manner as in the case of stable tracking.

In the pilot signal for each period is correctly detected at each of the ATF positions, the up/down counter D10 will produce a carry signal. This carry signal sets the RS F/F D11 and causes it to produce a high "H" level signal at its Q output. When the Q output of the RS F/F D11 is at a high "H" level, it may safely be concluded that the tracking has become stable.

When the Q output of the RS F/F D11 assumes a high "H" level, the switches SW1 and SW1, change their respective position to contact b and, as a result, the comparator A14 is supplied with reference levels, $+V_{2ref}$ and $-V_{2ref}$, which expand the range of the dead zone of the comparator A14 to such an extent that only a pilot signal of large amplitude can be detected to ensure noise-proof detection.

When the Q output of the RS F/F assumes a low "L" level, the two-input AND gate D14 will be turned on. When a predetermined time passes after the correct detection of the on-track pilot signal, the controller and timing generator D8 will output a sampling pulse GP1, which is applied to the control input of the S/H circuit A11 through he two-input AND gate D14 and the two-input OR gate D15, so that the signal indicating the amount of track deviation produced by the differential amplifier A9 is temporarily held by the S/H circuit A11. The signal level held by the S/H circuit A11 is supplied to the capstan servo as an ATF error signal.

When the $\overline{Q}$ output of the RS F/F D11 assumes a low "L" level, the two-input AND gate D14 is turned off, and thus the sampling pulse signal GP1 is applied to the control input of the S/H circuit A11 only through the two-input AND gate D13 and two-input OR gate D15. In this case, the other input of the two-input AND gate D13 is supplied with the output from the comparator A10. The output of the comparator A10 assumes a high "H" level when the output of the differential amplifier A9 is smaller than one half a value which is twice or three times as great as the ATF error signal held by the S/H circuit A11. Therefore, in the case where the output of the comparator 10 is a high level, if the difference between the levels of crosstalk from the pilot signals on two adjacent tracks is more than twice or three times the level of the ATF error signal, the output of the comparator A10 will assume low "L" level and the two-input AND gate D13 will be turned off, even if the pilot signals on track is correctly detected. In this case, no sampling pulse GP1 will not be applied to the S/H circuit A11 through the two-input AND the D13 and two-input OR gate D15, nor will the detected amount of track deviation be outputted as an ATF error signal. Therefore, if factors such as incomplete erasure of previously recorded pilot signals interfere with overwriting and cause an undue increase in the level of the pilot signal, the detected amount of track deviation will not be supplied to the capstan servo as an ATF error signal.

FIGS. 11A to 11G are a timing chart showing the waveforms of signals generated in various parts of the system shown in FIG. 4: FIG. 11A shows the output of the 130 kHz BPF, FIG. 11B shows the waveform of a digital signal converted from the 130 kHz component, FIG. 11C depicts an ontrack pilot window that assumes a high "H" level only when the on-track pilot signal is detected, FIG. 11D shows sampling pulses BP produced when the first half of each period of the pilot signal has passed, namely, when one full wave and a half has been detected, FIGS. 11E and 11F depict sampling pulses SP1 and SP2 which are produced during the period of the pilot signals on the two adjacent tracks, and FIG. 11G is a reset signal RT which is generated at the end of each period of the pilot signal.

Figure 12:
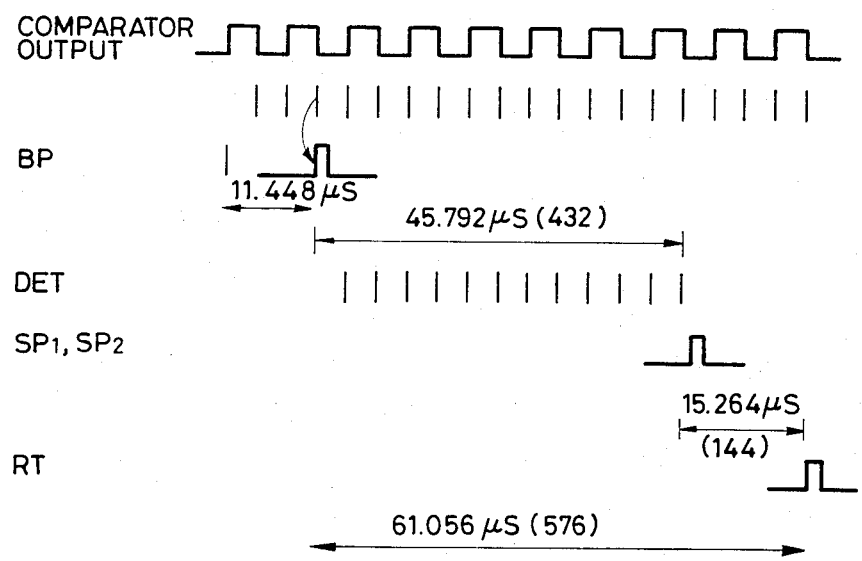
FIG. 12 timing chart showing more specifically the timed intervals of the signals shown in FIG. 8.
Figure 10A:
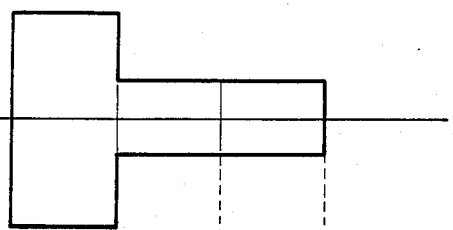
FIGS. 10A to 10D show the levels of pilot signals on the on-track and two adjacent tracks as a function of track deviation.
Figure 10B:
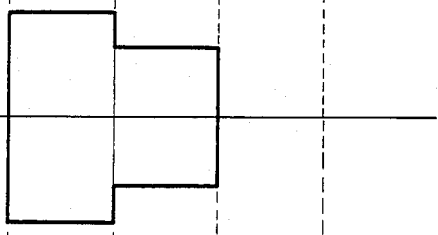
Figure 10C:
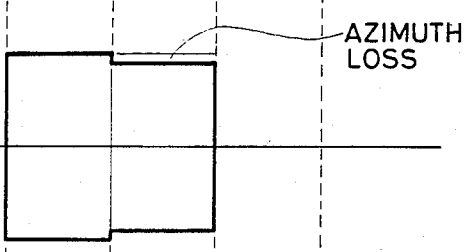
Figure 10D:
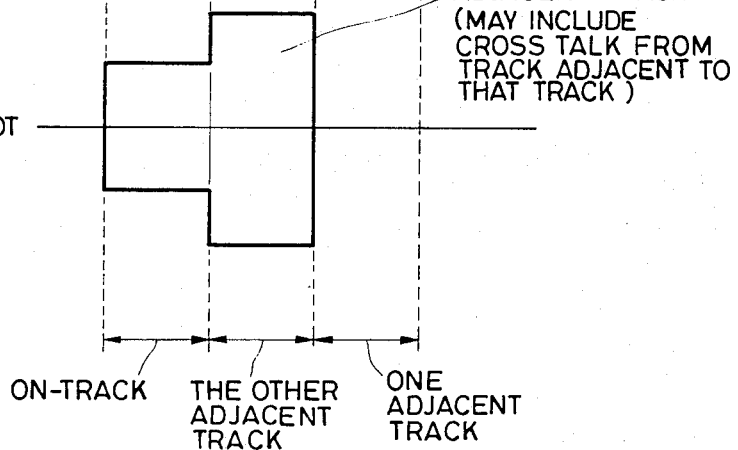

FIG. 12 is a timing chart showing more specifically the timed intervals of the comparator output, sampling pulses BP, SP1 and SP2, detection pulse DET and reset signal RT in each period of the pilot signal.

In the embodiment described above, the timing of sampling the crosstalk from the pilot signals on two tracks adjacent the on-track is referenced to the detection of the rising edge of a pilot signal. It should, however, be noted that the concept of the present invention equally applies to the case where the sampling timing is referenced to the detection of a sync signal.

As described in the foregoing, the system of the present invention is designed so that when the difference between the levels of crosstalk of pilot signals from the two tracks adjacent the on-track varies considerably as compared to the level of the signal being currently supplied to the capstan servo, the signal based on that level difference is not supplied to the capstan servo. This is effective in preventing the operation of the capstan servo from being disturbed on account of interference by an pilot signal that has not been completely erased in an over-write mode or because of erroneous detection of an incompletely erased sync signal.

What is claimed is:

1. In a rotary head type audio signal reproducing apparatus having at least two rotary heads for reproducing a plurality of signals on a recording medium, said plurality of signals containing a digital signal and a tracking pilot signal composed of a frequency signal with a small azimuth effect, said plurality of signals being recorded on each of a plurality of helical tracks in a predetermined format with the recording region in one track being independent of the recording region in another track in the longitudinal direction, the positions of the pilot signals recorded on four consecutive tracks differing from one track to another, each of said rotary heads having a width greater than the width of each track on which it scans, and a capstan servo being supplied with a signal that represents the amount of track deviation and which is produced on the basis of the difference between the levels of crosstalk of pilot signals picked up by said rotary heads from two tracks adjacent to the one track being reproduced, the improvement wherein said apparatus further comprises means for determining if a difference between levels of crosstalk of pilot signals from said two adjacent tracks has a predetermined relationship with a level of a signal being currently supplied to said capstan servo; and means for, if the result is negative, inhibiting said signal representing the amount of track deviation based on said level difference from being supplied to said capstan servo.

2. The rotary head type audio signal reproducing apparatus of claim 1, wherein said determining means comprises means for determining whether a difference between levels of crosstalk from said pilot signals from said two adjacent tracks is more than twice the level of said signal currently being supplied to said capstan servo.

3. The rotary head type audio signal reproducing apparatus of claim 1, wherein said determining means comprises means for determining whether a difference between levels of crosstalk from said pilot signals from said two adjacent tracks is more than three times the level of said signal currently being supplied to said capstan servo.

4. The rotary head type audio signal reproducing apparatus of claim 1, wherein said determining means comprises means for sampling said pilot signals for said adjacent tracks at a predetermined timing.

5. The rotary head type audio signal reproducing apparatus of claim 4, wherein said predetermined timing is at a rising edge of a pilot signal.

6. The rotary head type audio signal reproducing apparatus of claim 4, wherein said predetermined timing is referenced to detection of a sync signal.

* * * * *